US012759339B2

(12) United States Patent
Mackay et al.

(10) Patent No.: US 12,759,339 B2
(45) Date of Patent: Oct. 13, 2026

(54) PAINT TRAY LINER REDUCING GREENHOUSE GAS EMISSIONS AND PLASTIC WASTE

(71) Applicants: Daniel Mackay, Richmond Hill (CA); John Alexis, North York (CA); Lidiia Belousova, Richmond Hill (CA)

(72) Inventors: Daniel Mackay, Richmond Hill (CA); John Alexis, North York (CA); Lidiia Belousova, Richmond Hill (CA)

(73) Assignee: XtraVert Group Inc., Richmond Hill (CA)

(*) Notice: Subject to any disclaimer, the term of this patent is extended or adjusted under 35 U.S.C. 154(b) by 89 days.

(21) Appl. No.: 18/609,177

(22) Filed: Mar. 19, 2024

(65) Prior Publication Data

US 2025/0296382 A1 Sep. 25, 2025

(51) Int. Cl.
*B44D 3/12* (2006.01)
*B65D 1/00* (2006.01)
*B65D 1/34* (2006.01)

(52) U.S. Cl.
CPC .................................... *B44D 3/126* (2013.01)

(58) Field of Classification Search
CPC ....... B44D 3/126; B65D 1/34; B65D 81/3888
USPC ..................... 220/570, 495.02, 695; D4/122; D32/53.1
See application file for complete search history.

(56) References Cited

U.S. PATENT DOCUMENTS

| | | | |
|---|---|---|---|
| 704,592 | A | 7/1902 | Taylor |
| 790,200 | A | 5/1905 | Foster |
| 877,798 | A | 1/1908 | Richardson |
| 989,104 | A | 4/1911 | Anderson |
| 1,089,669 | A | 3/1914 | Preston |
| 1,398,851 | A | 11/1921 | Elmer |
| 1,423,726 | A | 7/1922 | Mohr et al. |
| 1,693,772 | A | 12/1928 | Allen |
| 1,792,433 | A | 2/1931 | Liebetruth |
| 1,815,457 | A | 7/1931 | Anderson |
| 1,886,406 | A | 11/1932 | Kniffin |
| 1,910,171 | A | 5/1933 | Kleinsmith |

(Continued)

FOREIGN PATENT DOCUMENTS

| | | | |
|---|---|---|---|
| AU | 8746491 | A | 10/1992 |
| AU | 3583899 | A | 1/2001 |

(Continued)

*Primary Examiner* — Gideon R Weinerth

(57) ABSTRACT

A paint tray and liner kit is provided. The kit includes a paint tray having a female receptacle, a liner in an uninverted state having an initially-interior surface and an initially-exterior surface opposite the initially-interior surface. The initially-interior surface defines an initially-interior paint well. The initially-exterior surface defines a male curvature removably received in the female receptacle of the paint tray. The liner is sufficiently flexible such that the initially-interior paint well is invertible from the uninverted state into an inverted state without perforating the liner. This may be done by application of hand force to the initially-exterior surface. In the inverted state, the initially-interior surface is an exterior surface defining a curvature that is substantially the same as the male curvature that was defined by the initially-interior surface, and the initially-exterior surface is an interior surface defining a new paint well.

13 Claims, 3 Drawing Sheets

(56) References Cited

U.S. PATENT DOCUMENTS

| | | | | | |
|---|---|---|---|---|---|
| 1,940,743 | A | | 12/1933 | Campbell | |
| 1,960,733 | A | | 5/1934 | Eagleson | |
| 1,968,140 | A | | 7/1934 | Gray | |
| 1,985,111 | A | | 12/1934 | Shofer et al. | |
| 2,013,175 | A | | 9/1935 | Bernard | |
| 2,065,828 | A | | 12/1936 | Jacob | |
| 2,104,686 | A | | 1/1938 | Wood | |
| 2,367,256 | A | | 1/1945 | Atkins | |
| 2,476,926 | A | | 7/1949 | Stocks | |
| 2,564,411 | A | | 8/1951 | Shinneman | |
| 2,579,907 | A | | 12/1951 | Condon | |
| 2,592,562 | A | | 4/1952 | Haley | |
| 2,599,830 | A | | 6/1952 | Hexter | |
| 2,630,241 | A | | 3/1953 | Schnabel | |
| 2,636,252 | A | | 4/1953 | Barnes et al. | |
| 2,645,443 | A | | 7/1953 | Pelletier | |
| 2,659,917 | A | | 11/1953 | Drum | |
| 2,681,785 | A | | 6/1954 | Jenny | |
| 2,694,825 | A | | 11/1954 | Touchett et al. | |
| 2,698,450 | A | | 1/1955 | Arthur | |
| 2,747,825 | A | | 5/1956 | Lachenmayer | |
| 2,759,620 | A | | 8/1956 | Pharris | |
| 2,763,880 | A | | 9/1956 | Kendall | |
| 2,779,960 | A | | 2/1957 | Ogren | |
| 2,806,312 | A | | 9/1957 | Grumbacher | |
| 2,846,173 | A | | 8/1958 | Grovesteen | |
| 2,855,170 | A | | 10/1958 | Matt | |
| 2,909,797 | A | * | 10/1959 | White | B44D 3/126 220/570 |
| 2,912,137 | A | | 11/1959 | Taylor | |
| 2,912,205 | A | | 11/1959 | Toune | |
| 2,917,764 | A | * | 12/1959 | Whittle | B44D 3/126 220/570 |
| 2,922,176 | A | * | 1/1960 | Bernhardt | B44D 3/126 D32/53.1 |
| 2,972,765 | A | | 2/1961 | Macy et al. | |
| 2,983,938 | A | | 5/1961 | Veazey | |
| 2,988,260 | A | | 6/1961 | Locke et al. | |
| 3,061,165 | A | | 10/1962 | Rench et al. | |
| 3,089,584 | A | | 5/1963 | King | |
| 3,091,793 | A | | 6/1963 | Bentley | |
| 3,119,351 | A | | 1/1964 | Ford | |
| 3,149,768 | A | | 9/1964 | Edward | |
| 3,154,282 | A | | 10/1964 | Monson | |
| 3,179,168 | A | | 4/1965 | Vincent | |
| 3,184,050 | A | | 5/1965 | Dahlberg et al. | |
| 3,264,672 | A | * | 8/1966 | Campbell | B44D 3/126 229/406 |
| 3,352,450 | A | | 11/1967 | Rawlins | |
| 3,380,100 | A | * | 4/1968 | Pharris | B44D 3/126 D9/425 |
| 3,467,259 | A | | 9/1969 | Silver | |
| 3,493,988 | A | * | 2/1970 | Tidwell | B44D 3/126 220/606 |
| 3,514,012 | A | | 5/1970 | Martin | |
| 3,558,000 | A | | 1/1971 | Mccann et al. | |
| 3,578,234 | A | | 5/1971 | Marchisen | |
| 3,591,299 | A | | 7/1971 | Pharris | |
| 3,593,951 | A | | 7/1971 | Warner et al. | |
| 3,602,939 | A | | 9/1971 | Schoenholz | |
| 3,625,388 | A | | 12/1971 | Golden et al. | |
| 3,643,854 | A | | 2/1972 | Holmes | |
| 3,729,764 | A | | 5/1973 | Vines | |
| 3,731,840 | A | | 5/1973 | Beutler et al. | |
| 3,752,494 | A | * | 8/1973 | Dunn | B44D 3/126 220/628 |
| 3,757,380 | A | | 9/1973 | Jackson | |
| 3,757,990 | A | | 9/1973 | Buth | |
| 3,761,995 | A | | 10/1973 | Rinard | |
| 3,827,621 | A | | 8/1974 | Bliss | |
| 3,858,787 | A | | 1/1975 | Bamburg et al. | |
| 3,870,420 | A | | 3/1975 | Hawk | |
| 3,947,135 | A | | 3/1976 | Hawk | |
| 4,509,226 | A | | 4/1985 | Allison et al. | |
| 4,541,542 | A | | 9/1985 | Florentino | |
| D292,533 | S | * | 10/1987 | Saraga | D32/53.1 |
| D319,518 | S | * | 8/1991 | Abel | D32/53.1 |
| 5,169,022 | A | * | 12/1992 | Elliott | B44D 3/126 220/570 |
| 5,641,087 | A | * | 6/1997 | Moffitt | B44D 3/126 206/520 |
| 5,887,708 | A | | 3/1999 | Gonzales | |
| D428,540 | S | * | 7/2000 | Grant | D32/53.1 |
| 6,276,554 | B1 | | 8/2001 | Lallement et al. | |
| 6,471,086 | B1 | * | 10/2002 | Fleckenstein | B44D 3/126 220/570 |
| D527,507 | S | * | 8/2006 | Grant | D32/53.1 |
| 7,874,448 | B1 | | 1/2011 | Doherty et al. | |
| 10,343,448 | B2 | * | 7/2019 | Smith | B44D 3/126 |
| 2005/0211101 | A1 | * | 9/2005 | Finnie, II | A21B 3/138 99/279 |
| 2006/0037960 | A1 | * | 2/2006 | Rosa | B44D 3/12 15/257.06 |
| 2007/0199942 | A1 | * | 8/2007 | Thom | B44D 3/126 220/570 |
| 2008/0040881 | A1 | * | 2/2008 | Maria cornelissen | B44D 3/126 15/257.06 |
| 2010/0200596 | A1 | * | 8/2010 | Wallace | B32B 3/28 220/570 |
| 2011/0052858 | A1 | * | 3/2011 | Austria | B32B 25/20 428/77 |
| 2014/0260105 | A1 | * | 9/2014 | Smith | B44D 3/126 53/458 |
| 2016/0152068 | A1 | | 6/2016 | Zamarripa | |
| 2021/0370709 | A1 | | 12/2021 | Alexis | |
| 2022/0134799 | A1 | * | 5/2022 | Boese | B44D 3/126 220/570 |
| 2022/0266624 | A1 | | 8/2022 | Asmus | |
| 2023/0074262 | A1 | * | 3/2023 | Marinov | B44D 3/12 |
| 2023/0339259 | A1 | * | 10/2023 | Christensen | B44D 3/12 |
| 2024/0010024 | A1 | * | 1/2024 | Berg | B44D 3/126 |

FOREIGN PATENT DOCUMENTS

| | | | |
|---|---|---|---|
| AU | 2002100168 | A4 | 4/2002 |
| AU | 2002100475 | B4 | 11/2002 |
| AU | 2002347212 | A1 | 6/2003 |
| AU | 2002302126 | A1 | 6/2004 |
| AU | 2005242179 | A1 | 6/2006 |
| AU | 2007100690 | A4 | 8/2007 |
| AU | 2016203325 | A1 | 12/2017 |
| CA | 496802 | A | 10/1953 |
| CA | 965052 | A | 3/1975 |
| CA | 1192852 | A | 9/1985 |
| CA | 2048025 | A1 | 1/1993 |
| CA | 2089781 | A1 | 8/1994 |
| CA | 2185757 | A1 | 3/1998 |
| CA | 2269040 | A1 | 10/1999 |
| CA | 2473357 | A1 | 7/2003 |
| CA | 2596556 | A1 | 2/2009 |
| CA | 2598236 | A1 | 2/2009 |
| CA | 2629676 | A1 | 10/2009 |
| CA | 2637357 | A1 | 1/2010 |
| CA | 2778425 | A1 | 11/2012 |
| CA | 2788385 | A1 | 3/2013 |
| CA | 2805617 | A1 | 8/2014 |
| CA | 2893353 | A1 | 12/2016 |
| CA | 2931474 | A1 | 11/2017 |
| CA | 3051364 | C | 10/2021 |
| CA | 3130146 | A1 | 3/2023 |
| CN | 202700758 | U | 1/2013 |
| CN | 203417833 | U | 2/2014 |
| CN | 205034476 | U | 2/2016 |
| CN | 105728284 | A | 7/2016 |
| CN | 105772345 | A | 7/2016 |
| CN | 105772349 | A | 7/2016 |
| CN | 105772356 | A | 7/2016 |
| CN | 105797924 | A | 7/2016 |
| CN | 205599455 | U | 9/2016 |
| CN | 205731885 | U | 11/2016 |
| CN | 210230363 | U | 4/2020 |
| CN | 210683071 | U | 6/2020 |

(56) References Cited

FOREIGN PATENT DOCUMENTS

| | | | | |
|---|---|---|---|---|
| CN | 211140002 | U | | 7/2020 |
| CN | 212125919 | U | | 12/2020 |
| CN | 112164528 | A | | 1/2021 |
| CN | 212289354 | U | | 1/2021 |
| CN | 213110432 | U | | 5/2021 |
| CN | 213472654 | U | | 6/2021 |
| CN | 213892036 | U | | 8/2021 |
| CN | 214825501 | U | | 11/2021 |
| CN | 216173830 | U | | 4/2022 |
| CN | 216547389 | U | | 5/2022 |
| CN | 218432386 | U | | 2/2023 |
| CN | 219540823 | U | | 8/2023 |
| CN | 116944176 | A | | 10/2023 |
| DE | 1171312 | B | | 5/1964 |
| DE | 2332676 | A1 | | 1/1974 |
| DE | 2706001 | A1 | | 8/1978 |
| DE | 10226871 | A1 | | 12/2003 |
| DE | 202009002372 | U1 | | 4/2009 |
| DE | 202019001981 | U1 | | 6/2019 |
| FR | 2433460 | A1 | | 4/1984 |
| FR | 2710007 | B1 | | 8/1996 |
| GB | 2399737 | B | | 8/2006 |
| GB | 2440330 | B | | 4/2010 |
| GB | 2445233 | B | | 5/2010 |
| GB | 2494182 | A | | 3/2013 |
| GB | 2558526 | A | | 7/2018 |
| GB | 2572917 | B | | 4/2022 |
| GB | 2605259 | B | | 1/2023 |
| IN | 439370 | B | | 7/2023 |
| IN | 501519 | B | | 1/2024 |
| JP | S59154165 | A | | 9/1984 |
| JP | S6071060 | A | | 4/1985 |
| JP | H0639156 | U | | 5/1994 |
| JP | H0713460 | U | | 3/1995 |
| JP | 3037192 | U | | 5/1997 |
| JP | H09248505 | A | | 9/1997 |
| JP | H1133472 | A | | 2/1999 |
| JP | 2000514375 | A | | 10/2000 |
| JP | U3072552 | U | | 10/2000 |
| JP | 3139869 | B2 | | 3/2001 |
| JP | 3081590 | U | | 11/2001 |
| JP | 3299550 | B2 | | 7/2002 |
| JP | 2002254019 | A | | 9/2002 |
| JP | 2003299999 | A | | 10/2003 |
| JP | 2003311195 | A | | 11/2003 |
| JP | 2004331225 | A | | 11/2004 |
| JP | 2009160535 | A | | 7/2009 |
| JP | 2010149070 | A | | 7/2010 |
| JP | 4537185 | B2 | | 9/2010 |
| KR | 890019215 | U | | 10/1989 |
| KR | 940019261 | U | | 8/1994 |
| KR | 950024760 | U | | 9/1995 |
| KR | 950024761 | U | | 9/1995 |
| WO | 9950153 | A1 | | 10/1999 |
| WO | WO-2014063185 | A1 | * | 5/2014 ............. B65D 25/16 |

* cited by examiner

PAINT TRAY LINER REDUCING GREENHOUSE GAS EMISSIONS AND PLASTIC WASTE

FIELD OF THE INVENTION

The present technology pertains to the field of painting accessories and, more specifically, to a paint tray and liner kit designed to reduce greenhouse gas emissions and material waste and therefore to contribute to environmental sustainability.

BACKGROUND

Painting tasks, such as new construction and renovations of commercial and residential buildings, have been on the rise in most parts of the world and involve the painting of such structures. The painting, especially in residential "Do it Yourself" markets, is often done with a paint roller and a paint tray with disposable single-use liners made out of plastic. The limited life of such liners combined with their ubiquity mean high volumes of such liners must be produced to meet world wide demand. This, in turn, means a high quantity of greenhouse gas emissions produced by the making of such large volumes of plastic paint tray liners. Further, disposal of such liners poses a significant world wide problem because plastics often take decades to decompose and end up in places in ecosystems where they cause harm to wildlife and humans. Plastic waste poses a significant sustainability problem around the world. Reducing greenhouse gas emissions and plastic waste are highly desirable goals in this context.

SUMMARY

The present technology provides a paint tray and liner kit for reducing greenhouse gas emissions by, among other things, providing paint tray liners with longer usable life that have the potential to significantly reduce the quantity of paint tray liners that must be produced annually to meet world wide demand for paint tray liners. Longer usable life may also help reduce material waste produced when paint tray liners are discarded.

One embodiment of the kit comprises a paint tray having a female receptacle; a liner in an uninverted state having an initially-interior surface and an initially-exterior surface opposite the initially-interior surface, the initially-interior surface defining an initially-interior paint well and initially-interior ribs, the initially-exterior surface defining a male curvature removably received in the female receptacle of the paint tray; and wherein: the initially-exterior surface defines initially-exterior ribs adjacent to the initially-interior ribs, and the liner is sufficiently flexible such that the initially-interior paint well is invertible from the uninverted state into an inverted state without perforating the liner by application of hand force to the initially-exterior surface; and wherein in the inverted state: the initially-interior surface is an exterior surface defining a curvature that is substantially the same as the male curvature that was defined by the initially-interior surface; and the initially-exterior surface is an interior surface defining a new paint well.

In some embodiments, a top edge of the initially-interior surface is free of laterally-extending structures.

In some embodiments, the liner is made of polysiloxane.

In some embodiments, the liner is made of rubber.

In some embodiments, the liner is made of a material that includes a polysiloxane.

In some embodiments, the material from which the liner is made and a thickness of the material are selected such that the liner is invertible between the uninverted state and the inverted state between one and one hundred times.

In some embodiments, the initially-interior surface of the liner defines at least two sloped sides; the initially-interior ribs include a first set of ribs that are on one of the at least two sloped sides; and the initially-interior ribs include a second set of ribs that are on another one of the at least two sloped sides.

In some embodiments, the first set of ribs is substantially perpendicular to the second set of ribs when the liner is stationary in an upright position on a flat horizontal surface and is viewed in 2 dimensions from a point directly above the predominant face of the liner.

In some embodiments, the liner includes a first identifier on the initially-interior surface and a second identifier on the initially-exterior surface; and the second identifier is different from the first identifier.

The present technology also provides a paint tray liner, comprising: a body shaped to substantially conform to an interior surface of a paint tray while the body is in an uninverted state; wherein the body is structured: to be invertible between the uninverted state and an inverted state between one and ten times without perforating the body, and to substantially conform to the interior surface of the paint tray while in the inverted state.

In some such embodiments, the body defines a paint well; and the paint well includes a first paint roller surface and a second paint roller surface that is different from the first paint roller surface.

In some such embodiments, the paint well has a height and defines a mouth that has a width; and the height and width are selected such that a ratio of the height to the width is between 1:7 and 1:10.

In some such embodiments, the paint well is substantially square along a predominant face of the liner.

In some such embodiments, the body is structured such that it has a first shape in the uninverted state and a second shape in the inverted state and the first shape is substantially the same as the second shape.

In some such embodiments, the paint tray liner further comprises a unique identifier on each of at least two opposing surfaces of the body.

In some such embodiments, the body is made of polysiloxane.

In some such embodiments, the body is manufactured to have a substantially uniform thickness that is less than 2 millimeters.

In some such embodiments, the thickness is between 0.45 millimeters and 0.85 millimeters.

In some such embodiments, the body is manufactured to have a substantially uniform thickness that is between 0.45 millimeters and 4.0 millimeters.

In yet another aspect, the present technology provides a method of manufacturing a paint tray liner, comprising: determining a shape of the paint tray liner to conform to a paint tray and selecting a material for the paint tray liner such that, when the paint tray liner is manufactured in an initial state, the paint tray liner is both: invertible by manual force from the initial state to an inverted state without creating apertures in the paint tray liner, and in substantially the same shape in the inverted state as in the initial state; and manufacturing the paint tray liner with the shape using the material.

In some such embodiments, the determining the shape and the selecting the material is executed such that when the paint tray liner is manufactured, the paint tray liner is invertible by manual force from the initial state to the inverted state via substantially elastic deformation.

In some such embodiments, the determining the shape of the paint tray liner includes defining a thickness of a majority of the paint tray liner to be less than two millimeters.

In some such embodiments, the determining the shape of the paint tray liner includes defining a perimeter of a mouth of the paint tray liner to be free from structures configured to increase a rigidity of the mouth of the paint tray liner.

BRIEF DESCRIPTION OF THE FIGURES

The figures are schematic.

DETAILED DESCRIPTION

Traditional paint trays and liners often contribute to plastic waste due to their disposable nature.

The present technology provides for, among other things, a longer life to the liner. This aspect helps to reduce the number of liners that are needed to complete a given paint job or jobs. Accordingly, the quantity of paint tray liners that is discarded annually around the world can be reduced by adopting the present technology.

Figure 1:
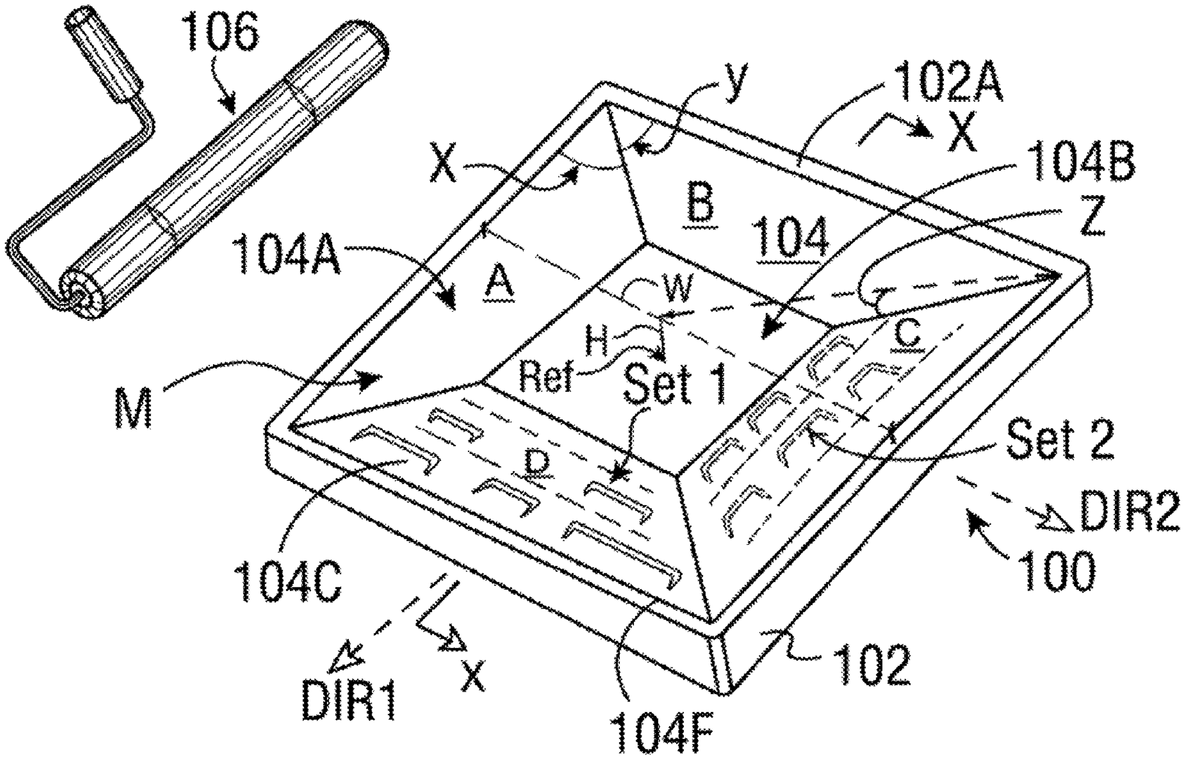
FIG. 1 shows a perspective view of a paint tray and paint tray liner kit comprising a paint tray and a paint liner, as well as a paint roller.

As shown in FIG. 1, a paint tray and liner kit 100 comprises a paint tray 102 and a liner 104 that is removably mated with the paint tray 102. The paint tray 102 includes a female receptacle 102A and provides a secure and stable base for the liner 104. The paint tray 102 is designed for compatibility with the liner's unique features, ensuring a snug fit during use. The paint tray 102 is made of a suitable material, such as a plastic that is sufficiently rigid to hold its shape when the liner 104 is removably mated to the pain tray 102, has paint in it, and is receiving forces from a paint roller 106 being rolled along the liner 104.

The liner 104 is shown in an uninverted state in which it includes an initially-interior surface 104A that defines an initially-interior paint well 104B and initially-interior ribs 104C which are schematically shown in solid lines. The paint well 104B holds paint during use. The ribs 104C help distribute paint evenly on a paint roller 106. In this embodiment, the initially-interior surface 104A defines four sloped sides labeled as (A), (B), (C), and (D). The ribs 104C include four sets of ribs, one on each of the sloped sides (A), (B), (C), (D). However, only two of the four sets are shown to maintain clarity of the figure. These two sets are labeled as Set1 and Set2. The other sets are mirror images of the two sets shown. A benefit of this embodiment is that a user of the kit 100 may need to reposition the kit 100 fewer times in some painting applications. For example, when painting a room, the user may position the liner in the room and move about painting one wall of the room after another. The user may thus move around the tray 102 and liner 104 and have a respective one of the sloped sides (A), (B), (C), (D) available to the user to roll a paint roller 106 against without having to reposition the tray 102 and liner 104 relative to the room. The sloped sides (A), (B), (C), (D) are thus configured as paint roller surfaces. In other embodiments, the liner 104 may have fewer or a greater number of paint roller surfaces. It is contemplated that, in other embodiments, the ribs 104C may have differing shapes, and/or the liner 104 may have only one set of ribs 104C or more than two sets, and may have a corresponding number of sloped sides.

In the present embodiment, the liner 104 further features a width W and a height H. The width W is measured at a mouth (M) of the liner 104 which in this embodiment is defined by the top edge of the liner 104. The height H is measured from the bottom of the paint well 104B to an imaginary line defined by the width W, as shown in FIG. 1. In this embodiment, the height and width are selected such that a ratio of the height to the width is 1:7. In other embodiments, the ratio is in a range of 1:7 to 1:20. In one aspect, such embodiments may be easier to invert as will be described later in this document. Other ratios may also be invertible. In some embodiments, the paint well 104B is defined by angles (X), (Y), (Z), that are between 25 degrees and 45 degrees. Angles (X) and (Y) are shown. These angles are the same for each corner of the paint 104B; but in other embodiments this may not be the case. In an aspect, embodiments defined by such angles may be easier to manufacture and/or invert, depending on the particular material of the liner paint well 104B.

Figure 2:
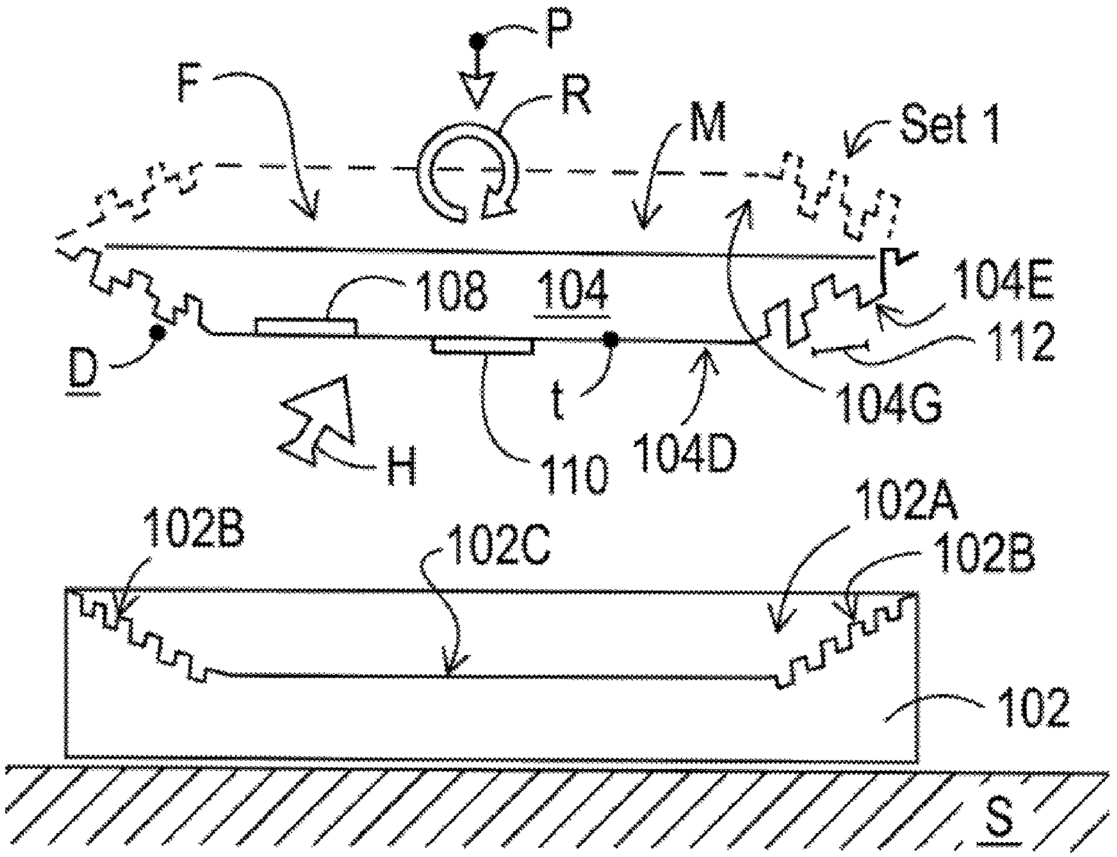
FIG. 2 shows a section view of the paint tray and paint tray liner of FIG. 1, taken along section lines X-X in FIG. 1, with the liner taken out of the paint tray.

Referring to FIG. 2 now, which for clarity shows the paint tray 102 separated from the liner 104. The liner 104 is made of a thin material that has a substantially uniform thickness. The liner 104 includes an initially-exterior surface 104D opposite the initially-interior surface 104A. The initially-exterior surface 104D defines a male curvature that is removably receivable in a female receptacle 102A of the paint tray 102. The liner's initially-exterior surface 104D includes initially-exterior ribs 104E adjacent to the initially-interior ribs 104C. As shown, the liner 104 is manufactured by injection molding or stamping such that a single sheet or layer of material that makes the liner makes both the initially-interior ribs 104C and the initially-exterior ribs 104E. In one aspect, this helps reduce the quantity of material needed to produce the liner 104 and therefore helps reduce waste of the material once the liner 104 is discarded. In other embodiments, the single layer feature need not be present.

As shown in FIG. 2, in embodiments in which the initially-exterior ribs 104E are present, the female receptacle 102A of the paint tray 102 defines recesses 102B for both the initially-interior ribs 104C and the initially-exterior ribs 104E. That is, some of the recesses 102B are sufficient in number and size to, and are positioned relative to a rest of the tray 102 to, removably receive respective ones of the initially-exterior ribs 104E when the liner 104 is removably mated to the paint tray 102 in the liner's uninverted state. The other recesses 102B are sufficient in number and size to, and are positioned relative to the rest of the tray 102 to, removably receive respective ones of the initially-exterior ribs 104E when the liner 104 is removably mated to the paint tray 102 in the liner's inverted state. That is, in some such embodiments, in the liner's inverted state, the initially-exterior ribs 104E are interior ribs extending into the new paint well, and the initially-interior ribs 104C are exterior ribs extending into corresponding ones of the recesses 102B in the paint tray when the liner 104 is removably mated to the paint tray 102 in the liner's inverted state. In one aspect, this configuration makes the kit 100 easier to use, in that the user may invert the paint well portion of the liner 104 and immediately mate the inverted liner 104 to the paint tray 102 without having to invert any of the ribs of the liner 104. As shown, in some such embodiments, the tray 102 may be free of ridges that may otherwise be present to fit into corresponding ribs in a liner that would be facing upward into the paint well. In other embodiments, the kit 100 may have different configurations and numbers of recesses and ribs, respectively.

Still referring to FIG. 2, the liner 104 is made of a material selected such that the liner 104 is sufficiently flexible to allow the initially-interior paint well 104B to be inverted into an inverted state, by application of hand force (H) to the initially-exterior surface 104A while the liner 104 is removed from the paint tray 102, without perforating the liner 104. Inverting the liner 104 places the liner 104 into an inverted state. When the liner 104 is placed in the inverted state, the initially-interior surface 104A becomes an exterior surface that defines the male curvature that was defined by the initially-exterior surface 104D when the liner 104 was in the uninverted state. In this embodiment, the geometry of the liner 104 is selected such that the male curvature is substantially the same in the inverted state and the uninverted state. In this embodiment, the geometry of the liner 104 is engineered such that the liner 104 conforms to the female receptacle 102A of the paint tray 102 in both its uninverted and its inverted states. More particularly in this embodiment, the liner 104 has a substantially the same shape in both of its states. This need not be the case in other embodiments. When the liner 104 is placed in the inverted state, the initially-exterior surface 104D becomes an interior surface, defining a new paint well 104G and thereby allowing a user to use the liner 104 again after turning the liner 104 over to orient the new paint well 104G upward to receive paint. Thus, the liner 104 has a longer usable life than prior art paint tray liners.

The liner 104 is made of polysiloxane. In this embodiment, the polysiloxane is selected, for example from known polysiloxanes, such that the liner 104 is invertible between the uninverted state and the inverted state between one and ten times without perforating the liner 104. In an aspect, this design may help minimize material waste while maintaining manufacturability of the liner. FIG. 2 shows the uninverted state of the liner 104 in solid lines, and its inverted state in dashed lines. Once the liner 104 is inverted, it can be rotated, as shown with arrow (R) to bring the male curvature of the liner 104 into alignment with the female receptacle 102A. It may then be removably mated to the female receptacle 102A. It is contemplated that other material(s) may be used, such as a thin non-rigid plastic or a rubber, to achieve similar functionality, with fewer or greater number of inversions possible before the liner 104 perforates. It is contemplated that the selection of the material may be made to achieve a different number of inversions before perforations develop in the liner 104, depending on the intended use(s) of the liner 104 for example.

Referring to FIG. 1, a top edge 104F of the liner 104 is free of laterally-extending structures that are present in prior art liners. In an aspect, this improves invertibility of the liner 104 and helps provide the functionality as described herein. In other embodiments, the liner 104 may have one or more laterally-extending structures while still providing at least some of the functionality described herein. In some such embodiments, an elastic material may need to be used to make the liner 104, such as polysiloxane or rubber. In some embodiments, the liner 104 may be made of a material selected such that inverting the liner 104 imparts no plastic deformation (i.e. imparts solely elastic deformation) to the liner 104. In some embodiments, the liner 104 may be made of a material selected such that inverting the liner 104 imparts substantially no plastic deformation to the liner 104. In yet other embodiments, the liner 104 may be made of a material selected such that inverting the liner 104 imparts at least some plastic deformation to the liner 104 while causing no perforations after at least an initial inversion.

Referring to FIG. 2 now, in some embodiments, the material from which the liner 104 is made and a thickness (t) of the material are selected such that the liner is invertible between the uninverted state and the inverted state between one and one hundred times. Such selections may be made from known materials with known properties using standard engineering principles to provide for the functionality described in this document.

In yet another aspect, the liner 104 further includes a first identifier 108 on the initially-interior surface 104A and a second identifier 110 on the initially-exterior surface 104D. The second identifier 110 is different from the first identifier 108. The identifier 108 and/or 110 may be any human-readable identifier suitable to distinguish the opposing sides of the liner 104 to a user. This helps the user to use the liner 104 with at least two products that are incompatible with each other, such as an oil-based paint and a water-based paint for example. Namely, after some use, the identifiers 108, 110 may help the user remember which side of the liner 104 was filled with which type of product. This may help avoid inadvertently pouring a product into the wrong side of the liner 104 and thus inadvertently mixing it with an already-present incompatible product. Each of the identifiers 108, 110 may be, for example, one of or a combination of: a letter, a color, a sticker, an embossment, a shape, an image, and a word. Other suitable identifiers are likewise contemplated. In other embodiments, the liner 104 has no identifiers.

Figure 3:
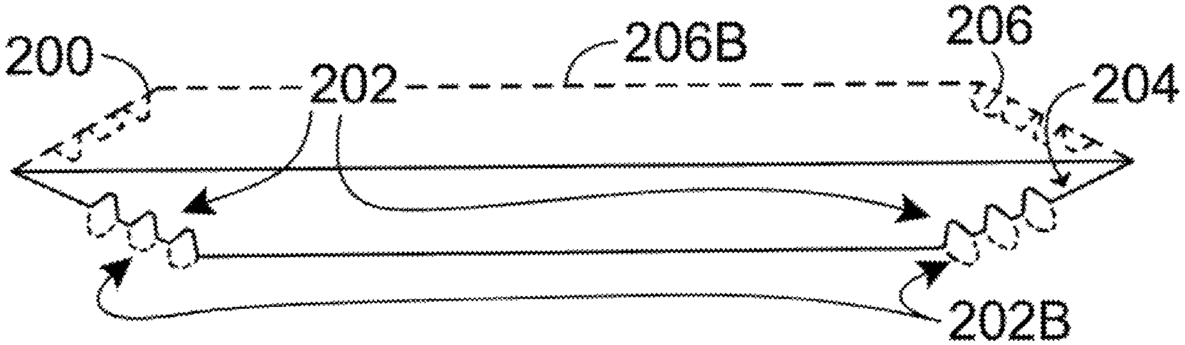
FIG. 3 shows a section view of another embodiment of the paint tray liner of FIG. 1, taken along section lines X-X in FIG. 1.

Referring now to FIG. 3, another embodiment of liner 104, namely liner 200, is shown. Liner 200 is similar to liner 104 except as noted here. To maintain this description concise, features that are similar are not shown or described. Liner 200 differs from liner 104 in that it has ribs 202 solely on its initially-internal surface 204. The ribs 202 have a geometry that is selected in combination with the material out of which the liner 200 is made such that the ribs 202 are invertible outward as shown in dashed lines labeled 202B, while a rest of the paint well 206 is invertible in inward as shown with dashed lines 206B. The inversions are executable by hand force applied on corresponding surfaces of the liner 200. When the ribs 202 and the paint well 206 are inverted, the liner 200 forms a new paint well with new ribs. The new paint well and ribs are formed by the inverted paint well 206 and ribs 202, respectively. In one aspect, this embodiment may help reduce the material required to make the liner 200 by not having additional ribs that face outward while the liner 200 is in its uninverted state. Accordingly, this embodiment may also help reduce material required to make a corresponding paint tray as the corresponding tray would not need to have recesses to receive such outward ribs.

Figure 4:
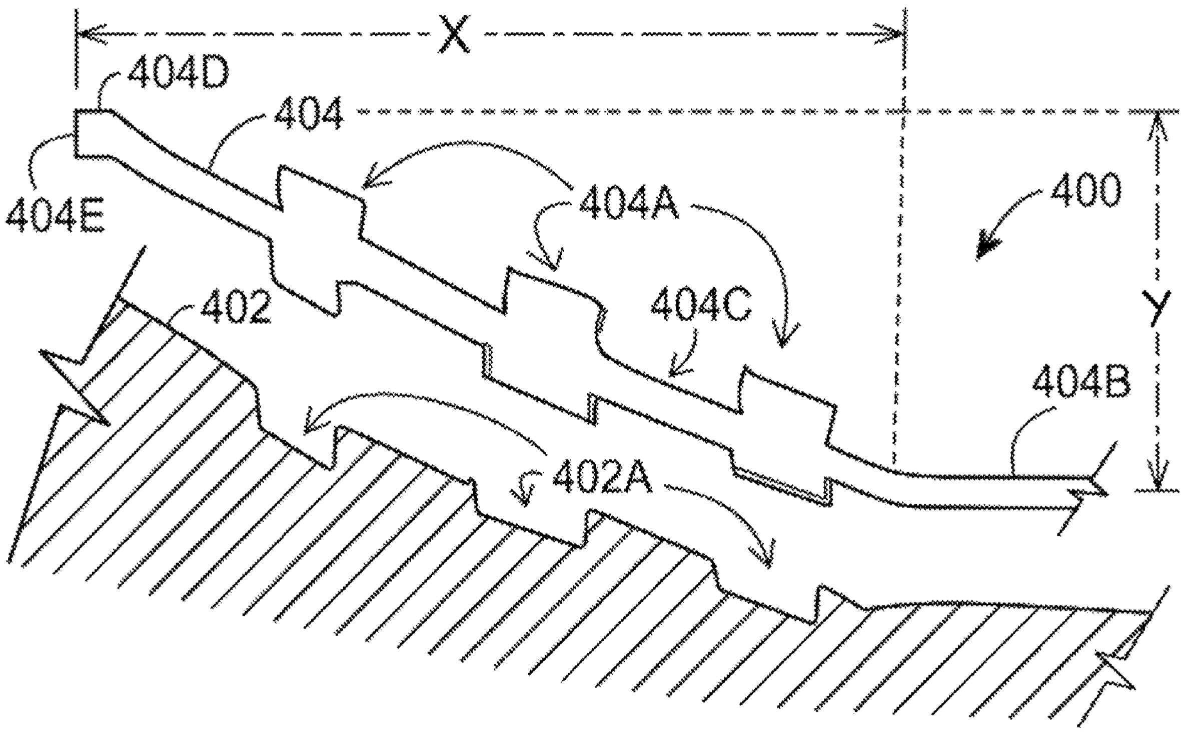
FIG. 4 shows another paint tray and paint tray liner kit by showing a representative part of a cross-section taken along a plane passing through the paint tray and paint liner.

Now referring to FIG. 4, another embodiment of the kit 100, namely kit 400 is shown. Kit 400 is similar to kit 100 except as noted next. To maintain this description concise, features that are similar are not shown or described. As such, FIG. 4 shows a relevant part of a cross-section taken along a plane passing through the paint tray 402 and liner 404. The paint tray 402 includes recesses 402A dimensioned to removably receive respective ones of ribs 404A of the liner 404. The ribs 404A are double-sided. It may likewise be said that the liner 400 has initially-interior ribs, which are shown as those of the ribs 404A that are on the top side of the liner 404 in the orientation shown in FIG. 4, and initially-exterior ribs, which are opposite the initially-interior ribs. Namely, as shown, each rib 404A protrudes in opposite directions from both sides of the liner 404 and is shaped and positioned relative to a rest of the liner 404 such that it fits into a respective recess 402A in both the uninverted state and inverted state of the liner 404. In an aspect, this may reduce the time required of a user to invert and continue using the liner 404 on a next side after having used the liner 404 on a previous side. In this embodiment, the liner 400 is unitary and made out of polysiloxane. Other materials may be used to provide the functionality described in this document. It is contemplated that the liner 400 may be made of multiple parts.

Further as shown, the liner 404 has a paint well defined by a bottom surface 404B that on all its sides is contiguous to a sloped surface of the liner 404. In this embodiment, the bottom surface 404B is rectangular and there are four sloped surfaces that include the surface 404C. In other embodiments, the bottom surface 404B may have a different shape with a different number of sides and a respective sloped surface extending from each of the sides. In this embodiment, all of the sloped surfaces have ribs 404A, and are similar to surface 404C. Thus, to maintain clarity, only the surface 404C is shown. It is contemplated that one or more of the sloped surfaces may lack ribs and/or have a different combination of ribs in other embodiments. Each of the sloped surfaces is disposed at a slope (m), relative to the bottom surface 404B. The slope (m) is defined as m=y/x. As shown, (y) is the rise from the bottom surface 404B to the top edge 404D, and (x) is the run from a closest edge of the bottom surface 404B (closest to the relevant sloped surface), to an outer edge 404E of the relevant sloped surface. In this embodiment, the slope (m) of each sloped surface is 1.0. In an aspect, this geometry may facilitate invertibility. In another aspect, this geometry may reduce the footprint of the kit 400 which may facilitate its use in smaller spaces. In other embodiments, each of the sloped surfaces has a slope (m) that is between 1.0 and 0.3. In an aspect, this geometry may facilitate invertibility as described herein. In some such embodiments, each sloped surface may have the same slope as the rest of the sloped surfaces. In some such embodiments, one or more of the sloped surfaces may each have a different slope (m). In some such embodiments, one or more of the sloped surfaces may each have a unique slope (m).

Further embodiments of the paint tray liner and paint tray are contemplated. Some such embodiments are described herein next as clauses:

Clause 1. A paint tray 102 and liner 104 kit 100 for reducing environmental impact by reducing plastic waste, comprising: a paint tray 102 having a female receptacle 102A; a liner 104 in an uninverted state having an initially-interior surface 104A and an initially-exterior surface 104D opposite the initially-interior surface 104A, the initially-interior surface 104A defining an initially-interior paint well 104B and initially-interior ribs 104C, the initially-exterior surface 104D defining a male curvature removably received in the female receptacle 102A of the paint tray 102; and wherein: the initially-exterior surface 104D defines initially-exterior ribs 104E adjacent to the initially-interior ribs 104C, and the liner 104 is sufficiently flexible such that the initially-interior paint well 104B is invertible from the uninverted state into an inverted state without perforating the liner 104 by application of hand force (H) to the initially-exterior surface 104D; and wherein in the inverted state: the initially-interior surface 104A is an exterior surface defining a curvature that is substantially the same as the male curvature that was defined by the initially-interior surface 104A; and the initially-exterior surface 104D is an interior surface defining a new paint well 104G.

Clause 2. The kit of clause 1, wherein a top edge 104F of the initially-interior surface 104A is free of laterally-extending structures.

Clause 3. The kit of clause 1 or 2, wherein the liner 104 is made of polysiloxane.

Clause 4. The kit of any one of clauses 1 to 3, wherein the liner 104 is made of rubber.

Clause 5. The kit of any one of clauses 1 to 4, wherein the liner 104 is made of a material that includes a polysiloxane.

Clause 3A. The kit of clause 1 or 2, wherein: the female receptacle of the paint tray includes recesses; the initially-exterior ribs are removably received in respective ones of the recesses; and the initially-interior ribs are positioned relative to the initially-exterior ribs such that the initially-interior ribs are removably received in the respective ones of the recesses while the liner is in the inverted state and the curvature of the liner is removably received in the female receptacle of the paint tray.

Clause 4A. The kit of any one of clauses 1 to 3, wherein: the paint well is defined by a bottom surface that has a plurality of sides and a sloped surface extending from each side of the plurality of sides; and each of the sloped surfaces extends at a slope that is between 1.0 and 0.3.

Clause 6. The kit of any one of clauses 1 to 5, wherein the material from which the liner 104 is made and a thickness of the material are selected such that the liner 104 is invertible between the uninverted state and the inverted state between one and one hundred times.

Clause 7. The kit of any one of clauses 1 to 6, wherein: the initially-interior surface 104A of the liner 104 defines at least two sloped sides (A), (B), (C), (D); the initially-interior ribs 104C include a first set of ribs (Set1) that is on one of the at least two sloped sides (A), (B), (C), (D); and the initially-interior ribs 104C include a second set of ribs (Set2) that is on another one of the at least two sloped sides (A), (B), (C), (D).

Clause 8. The kit of clauses 7, wherein the first set of ribs (Set1) is substantially perpendicular to the second set of ribs (Set2) in at least one dimension when the liner 104 is stationary in an upright position on a flat horizontal surface(S) and is viewed in two dimensions from a point (P) directly above the predominant face (F) of the liner 104.

Clause 9. The kit of any one of clauses 1 to 8, wherein: the liner 104 includes a first identifier 108 on the initially-interior surface 104A and a second identifier 110 on the initially-exterior surface 104D; and the second identifier 110 is different from the first identifier 108.

Clause 10. A paint tray liner 104, comprising: a body 104 shaped to substantially conform to an interior surface of a paint tray 102 while the body 104 is in an uninverted state; wherein the body 104 is structured: to be invertible between the uninverted state and an inverted state between one and ten times without perforating the body

104, and to substantially conform to the interior surface of the paint tray 102 while in the inverted state.

Clause 11. The paint tray liner 104 of clause 10, wherein: the body 104 defines a paint well 104B; and the paint well 104B includes a first paint roller surface (i.e. any one of (A), (B), (C), (D)) and a second paint roller surface (i.e. any other one of (A), (B), (C), (D)) that is different from the first paint roller surface (i.e. the any one of (A), (B), (C), (D)).

Clause 12. The paint tray liner 104 of clause 11, wherein: the paint well 104B has a height (H) and defines a mouth (M) that has a width (W); and the height (H) and width (W) are selected such that a ratio of the height (H) to the width (W) is between 1:7 and 1:10.

Clause 13. The paint tray liner 104 of clause 11 or 12, wherein the paint well 104B is substantially square along a predominant face (F) of the liner 104.

Clause 11B. The paint tray liner 104 of clause 10, wherein the body 104 defines: a first paint roller surface (e.g. where Set1 ribs are) extending in a first direction (DIR1) relative to a reference point (Ref) on the body; and a second paint roller surface (e.g. where Set2 ribs are) extending in a second direction (DIR2) relative to the reference point (Ref) on the body 104, the first direction (DIR1) being different from the second direction (DIR2).

Clause 12B. The paint tray liner 104 of clause 11B, wherein the paint well 104B has a height (H) and defines a mouth (M) that has a width (W); and the height (H) and width (W) are selected such that a ratio of the height (H) to the width (W) is between 1:7 and 1:20.

Clause 13B. The paint tray liner 104 of claim 11B or 12B, wherein the body 104 includes a paint well 104B and a paint roller surface (e.g. where Set1 ribs are) and ribs (e.g. ribs Set1) on the paint roller surface, and the ribs are made of a material (e.g. an elastomer) selected in combination with a geometry of the ribs such that the ribs are invertible between an uninverted state of the ribs and an inverted state of the ribs between one and ten times without perforating the body 104.

Clause 14. The paint tray liner 104 of any one of clauses 10 to 13, wherein the body 104 is structured such that it has a first shape in the uninverted state and a second shape in the inverted state and the first shape is substantially the same as the second shape, as shown in the upper half of FIG. 2 for example.

Clause 15. The paint tray liner 104 of any one of clauses 10 to 14, further comprising a unique identifier 108, 110 on each of at least two opposing surfaces of the body 104.

Clause 16. The paint tray liner 104 of any one of clauses 10 to 15, wherein the body 104 is made of silicone.

Clause 17. The paint tray liner 104 of any one of clauses 10 to 16, wherein the body 104 is manufactured to have a substantially uniform thickness that is less than 2 millimeters.

Clause 19. The paint tray liner 104 of clause 17, wherein the thickness is between 0.45 millimeters and 0.85 millimeters.

Clause 20. The paint tray liner 104 of any one of clauses 10 to 16, wherein the body 104 is manufactured to have a substantially uniform thickness that is between 0.45 millimeters and 4.0 millimeters.

Clause 17. A paint tray liner, comprising: a body 104 shaped to substantially conform to an interior surface 102C of a paint tray 102 while the body 104 is in an uninverted state; wherein: the body 104 is structured to be invertible between the uninverted state and an inverted state without perforating the body 104, the body 104 defines a paint roller surface with ribs (e.g. ribs Set 1 and the surface they are part of), and the body 104 is made of a material (e.g. an elastomer) selected such that the ribs are invertible without perforating the body 104. In an aspect, less material may be used to make such embodiments while still providing the invertibility and longer liner life. In some such embodiments, the liner may be removably mateable to a paint tray that does not have indentations for removably receiving respective ribs extending toward the liner when the liner is removably mated to the paint tray. Such embodiments may further help reduce material used during manufacturing of the paint tray and hence may reduce material going to waste after the useful life of the paint tray.

Clause 18. The paint tray liner of clause 17, wherein the ribs have a footprint 112 that is sufficiently large to enable the ribs (e.g. Set 1) to be invertible without perforating the body 104.

Clause 19. The paint tray liner of clause 17 or 18, wherein the body 104 has a thickness that is between 0.45 millimeters and 2.00 millimeters.

Clause 20. The paint tray liner of any one of clauses 10 to 16, wherein the body is made of an elastomer.

The embodiments described herein may be made using known materials and manufactured using known techniques suitable to each particular material of the liner and tray, respectively, to provide the innovative features and functions described herein. The present technology provides, among other benefits, an environmentally conscious solution to the issues of plastic waste in the painting industry and may therefore contribute to the sustainability of the environment. It is contemplated that the liner and/or tray may have different geometries than those shown in this patent application while still providing at least some of the novel functionalities described herein. The present patent application discloses sufficient details to enable a person of ordinary skill in the art to make the embodiments described herein. Some details are omitted to maintain clarity of the patent application. All omitted details are ascertainable after a person of ordinary skill in the art reads and understands the present patent application, without undue burden by the person of ordinary skill in the art and using the person's common general knowledge.

The invention claimed is:

1. A paint tray and liner kit, comprising:

a paint tray having a female receptacle;

a liner in an uninverted state having an initially-interior surface and an initially-exterior surface opposite the initially-interior surface, the initially-interior surface defining an initially-interior paint well and initially-interior ribs, the initially-exterior surface defining a male curvature removably received in the female receptacle of the paint tray; and wherein:

the initially-exterior surface defines initially-exterior ribs adjacent to the initially-interior ribs, and the liner is sufficiently flexible such that the initially-interior paint well is invertible from the uninverted state into an inverted state without perforating the liner by application of hand force to the initially-exterior surface; and wherein in the inverted state:

the initially-interior surface is an exterior surface defining a curvature that is substantially the same as the male curvature that was defined by the initially-interior surface; and the initially-exterior surface is an interior surface defining a new paint well.

2. The kit of claim 1, wherein a top edge of the initially-interior surface is free of laterally-extending structures.

3. The kit of claim 1, wherein:

the female receptacle of the paint tray includes recesses;

the initially-exterior ribs are removably received in respective ones of the recesses; and the initially-interior ribs are positioned relative to the initially-exterior ribs such that the initially-interior ribs are removably received in the respective ones of the recesses while the liner is in the inverted state and the curvature of the liner is removably received in the female receptacle of the paint tray.

4. The kit of claim 1, wherein:

the paint well is defined by a bottom surface that has a plurality of sides and a sloped surface extending from each side of the plurality of sides; and each of the sloped surfaces extends at a slope that is between 1.0 and 0.3.

5. The kit of claim 1, wherein the liner is made of polysiloxane.

6. The kit of claim 1, wherein the material from which the liner is made and a thickness of the material are selected such that the liner is invertible between the uninverted state and the inverted state between one and one hundred times.

7. The kit of claim 1, wherein:

the initially-interior surface of the liner defines at least two sloped sides;

the initially-interior ribs include a first set of ribs that are on one of the at least two sloped sides; and the initially-interior ribs include a second set of ribs that are on another one of the at least two sloped sides.

8. The kit of claim 7, wherein the first set of ribs is substantially perpendicular to the second set of ribs when the liner is stationary in an upright position on a flat horizontal surface and is viewed in 2 dimensions from a point directly above the predominant face of the liner.

9. The kit of claim 1, wherein:

the liner includes a first identifier on the initially-interior surface and a second identifier on the initially-exterior surface; and the second identifier is different from the first identifier.

10. A paint tray liner, comprising:

a body shaped to substantially conform to an interior surface of a paint tray while the body is in an uninverted state;

wherein:

the body is structured to be invertible between the uninverted state and an inverted state without perforating the body, the body defines a paint roller surface with ribs, and the body is made of a material selected such that the ribs are invertible without perforating the body.

11. The paint tray liner of claim 10, wherein the ribs have a footprint that is sufficiently large to enable the ribs to be invertible without perforating the body.

12. The paint tray liner of claim 10 or 11, wherein the body has a thickness that is between 0.45 millimeters and 2.00 millimeters.

13. The paint tray liner of claim 10, wherein the body is made of an elastomer.

* * * * *